United States Patent [19]
Ort

[11] Patent Number: 5,784,527
[45] Date of Patent: Jul. 21, 1998

[54] SYSTEM AND METHOD FOR ERROR HANDLING DURING PLAYBACK OF AN AUDIO/VIDEO DATA STREAM

[75] Inventor: Jeffrey Ort, Kirkland, Wash.

[73] Assignee: Cirrus Logic, Inc., Fremont, Calif.

[21] Appl. No.: 620,654

[22] Filed: Mar. 22, 1996

[51] Int. Cl.$^6$ .................................................. H04N 5/92
[52] U.S. Cl. ................................................ 386/111; 386/47
[58] Field of Search ........................... 386/46, 111, 112, 386/125, 124, 69, 47, 71, 95, 96; H04N 5/92, 5/94

[56] References Cited

U.S. PATENT DOCUMENTS

| | | |
|---|---|---|
| 4,969,039 | 11/1990 Koga et al. | 386/111 |
| 5,668,916 | 9/1997 Fujinami | 386/47 |

*Primary Examiner*—Thai Tran
*Assistant Examiner*—Huy Nguyen
*Attorney, Agent, or Firm*—Wagner, Murabito & Hao; Steven A. Shaw

[57] ABSTRACT

A system and method for handling errors encountered in an audio/video data stream during playback. In one application, the audio/video data stream originates from an MPEG (e.g., Motion Pictures Expert Group) source and is a playback file of the MPEG format. Upon receiving an error interrupt originating from a hardware video processor unit, the novel system executes a group of predetermined error handling processes. A playback error can result from bad data within the playback file's data stream, the data bus, or other transmission error. One error recovery process used by the novel system causes the playback system to skip B and P frames until an I frame is reached which is processed normally and playback resumes. Another error recovery process causes the playback system to seek forward a predetermined number of seconds and/or frames to resume normal playback in order to avoid a bad media sector. A third error recovery process causes the playback system to seek forward to a next sequence header to resume normal playback. The processes are performed in a novel error sequence in which repeat errors are handled by different processes. Back-to-back errors occurring outside a predetermined time or data window are not considered repeat errors and reinitialize the error sequence. If the error sequence fails to avoid the error, the user or viewer is informed that the playback file may be non-MPEG compliant and playback is temporarily terminated.

22 Claims, 12 Drawing Sheets

400
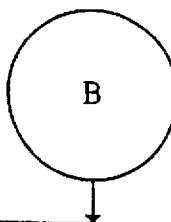
B
DETERMINE NEW ADJUSTED DATA RATE
BASE ON APPROXIMATE BYTE LOCATION
AND LOCATED TIME STAMP
510
AVERAGE NEW AND PREVIOUS ADJUSTED
DATA RATES TO DETERMINE CURRENT
DATE RATE
520
DETERMINE NEW APPROXIMATE BYTE
LOCATION BASED ON CURRENT DATA RATE
AND REQUESTED SEEK-TO TIME
530
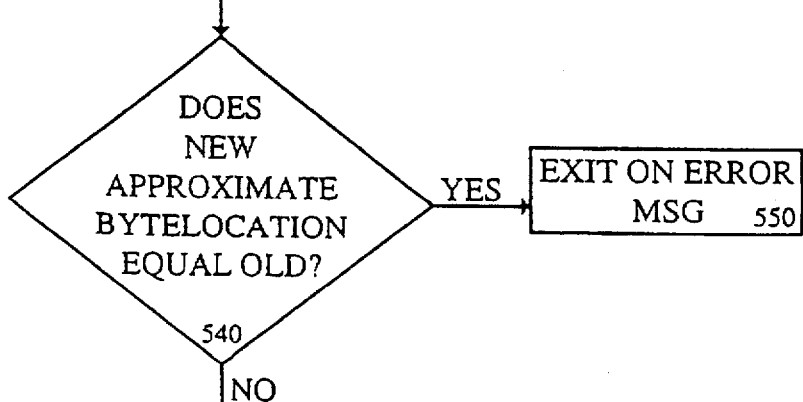
SEEK TO NEW APPROXIMATE BYTE
LOCATION IN AUDIO/VIDEO FILE
560
FIG. 10
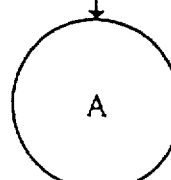
A

SYSTEM AND METHOD FOR ERROR HANDLING DURING PLAYBACK OF AN AUDIO/VIDEO DATA STREAM

FIELD OF THE INVENTION

The present invention relates to the field audio and video playback systems. More specifically, the present invention relates to an error handling system in a computer controlled audio and video playback system that utilizes formatted digital audio and video signals.

BACKGROUND OF THE INVENTION

Recent developments in computer technology have increased the storage capacity of media storage devices (e.g., hard disks, CD-ROMs, etc.) and have simultaneously increased the volatile memory storage capacity and data processing speeds of computer systems. These developments have facilitated using computer systems for processing and playback of signals representing motion pictures with associated sound recordings and other audio/visual multimedia works. To meet the demand for playing back audio/visual works in digital format, the Motion Picture Expert Group or MPEG format was developed. The MPEG format, as described in international specifications ISO/IEC 11172-1 to ISO/IEC 11172-3, et seq., provides data compression, decompression and data encoding and decoding techniques for digital audio and video signals to facilitate their storage, transmission and reproduction on computer systems. The MPEG format supplies the digital audio and video signals using a constant frame rate but a variable data rate. Specifically, the MPEG format offers an effective mechanism for intelligently compressing and decompressing digital video and audio signals and providing the decompressed signals to a playback mechanism for viewing.

In the past, recorded audio and video signals were not encoded with respect to any particular compression or coded formats. For example, each frame of data within a prior art audio/video signal recording was separately recorded in its entirety. The audio/video signals were essentially read off of their recorded media and presented directly to a viewing unit (e.g., speaker system and display unit) at their recorded frequency. Signals recorded in digital form were sometimes converted to analog format for viewing (or vice-versa), but prior art audio/video signal recordings were typically not otherwise compressed or encoded.

Therefore, errors encountered in the playback of prior art audio/video recordings (if detected at all) were readily corrected by manually forwarding through the audio/video signal by some arbitrary amount in an attempt to avoid the bad section of the media. However, often media errors were not detected or corrected at all in the prior art recordings because the playback systems were not sophisticated enough to automatically differentiate bad media from the expected playback. Importantly, in the prior art playback systems, there was no mechanism for detecting when the error was successfully avoided nor was there any mechanism for detecting if the error was reoccurring in the audio/video playback file.

The MPEG signal recording and playback format encodes audio and video digital signals in an intelligent manner using specially encoded data packets having encoded video frames (e.g., I, B, and P frames), variable data rates, and other special data encoding mechanisms and procedures. As a result of the data encoding, as much as 95 percent of the information stored in a prior art audio/video signal recording is eliminated in an MPEG recording with an insubstantial loss of playback quality. For example, during audio/video data encoding and recording, MPEG data is compressed using different frame types. Routinely, in lieu of storing all data within a conventional video frame, MPEG encodes and records only those parts of sequential frames that are altered from frame to frame (among other techniques) in an effort to compress the data.

The encoded MPEG signal recording and playback format poses special problems for recovering from signal errors within a playback file because the MPEG playback file is specially decoded during playback. For instance, an error within the MPEG playback file can cause the playback system to fault during its decoding process because information decoded at one point of the MPEG system is dependent on the information just previously decoded. Therefore, restarting after the fault poses special problems in MPEG data because information following a fault may be dependent on the faulting data thus expanding the scope of the fault and complicating the error recovery system. What is needed is an error recovery system that effectively recovers from multiple fault conditions in an encoded recorded signal format, such as MPEG. The present invention provides this functionality.

Accordingly, it is desired to provide an error recovery system operable with an intelligent recording and playback format having encoded and compressed data. It is further desired to provide the above error recovery system that is also capable of handling multiple error conditions. It is desired further to provide a system such as described above that is operable with playback files recorded in the MPEG format. The present invention provides the above functionality.

SUMMARY OF THE INVENTION

The present invention includes a system and method for handling errors encountered in an audio/video data stream during playback. In one application, the audio/video data stream originates from an MPEG (e.g., Motion Pictures Expert Group) source and is a playback file of the MPEG format. The novel error handling system of the present invention operates during playback of the playback file. Upon receiving an error interrupt originating from a hardware video processor unit, the present invention executes a group of predetermined error handling processes. A playback error can result from bad data within the playback file's data stream, the system data bus, or other related transmission error. One error handling process used by the present invention system causes the playback system to skip B and P frames until an I frame is reached which is processed normally and playback resumes. Another recovery process causes the playback system to seek forward a predetermined number of seconds and/or frames then resumes normal playback in order to avoid a bad media sector. A third process causes the playback system to seek forward to a next sequence header, then resumes normal playback. The above recovery processes are performed in a determined error sequence of the present invention in which repeat errors are handled by different processes according to the error sequence. Back-to-back errors occurring outside a predetermined time or data window are not considered repeat errors and reinitialize the error sequence. If the error sequence fails to avoid the error, the user or viewer is informed that the playback file may be non-MPEG compliant and playback is temporarily terminated.

Specifically, in a digital playback system including a video processor unit, embodiments of the present invention include a method of handling playback errors in a playback file, the method comprising the steps of: (a) in response to a detected playback error, skipping frames of the playback file of a first frame type until a frame of the playback file of a second frame type is encountered and resuming playback of the playback file; (b) in response to a detected playback error, seeking forward within the playback file by a predetermined amount defined by a seek parameter and resuming playback of the playback file; and (c) in response to a detected playback error, seeking forward within the playback file to a position marked by a substantial scene change within a video portion of the playback file and resuming playback of the playback file.

Embodiments of the present invention include the above and wherein the frames of the first frame type are B and P frames of the Motion Pictures Expert Group (MPEG) format and wherein the frame of the second frame type is an I frame of the MPEG format and wherein the predetermined amount defined by the seek parameter represents a measure of time on the order of seconds or alternatively can represent a measure of data on the order of kilobytes. Embodiments include the above and wherein the position marked by a substantial scene change within the video portion of the playback file is represented by a sequence header within the Motion Pictures Expert Group (MPEG) format. Embodiments also include a computer playback system implemented in accordance with the above.

BRIEF DESCRIPTION OF THE DRAWINGS

FIG. 10 is a flow diagram illustrating additional intermediary steps of the seek procedure used by the present invention.

DESCRIPTION OF THE PREFERRED EMBODIMENTS

Figure 1:
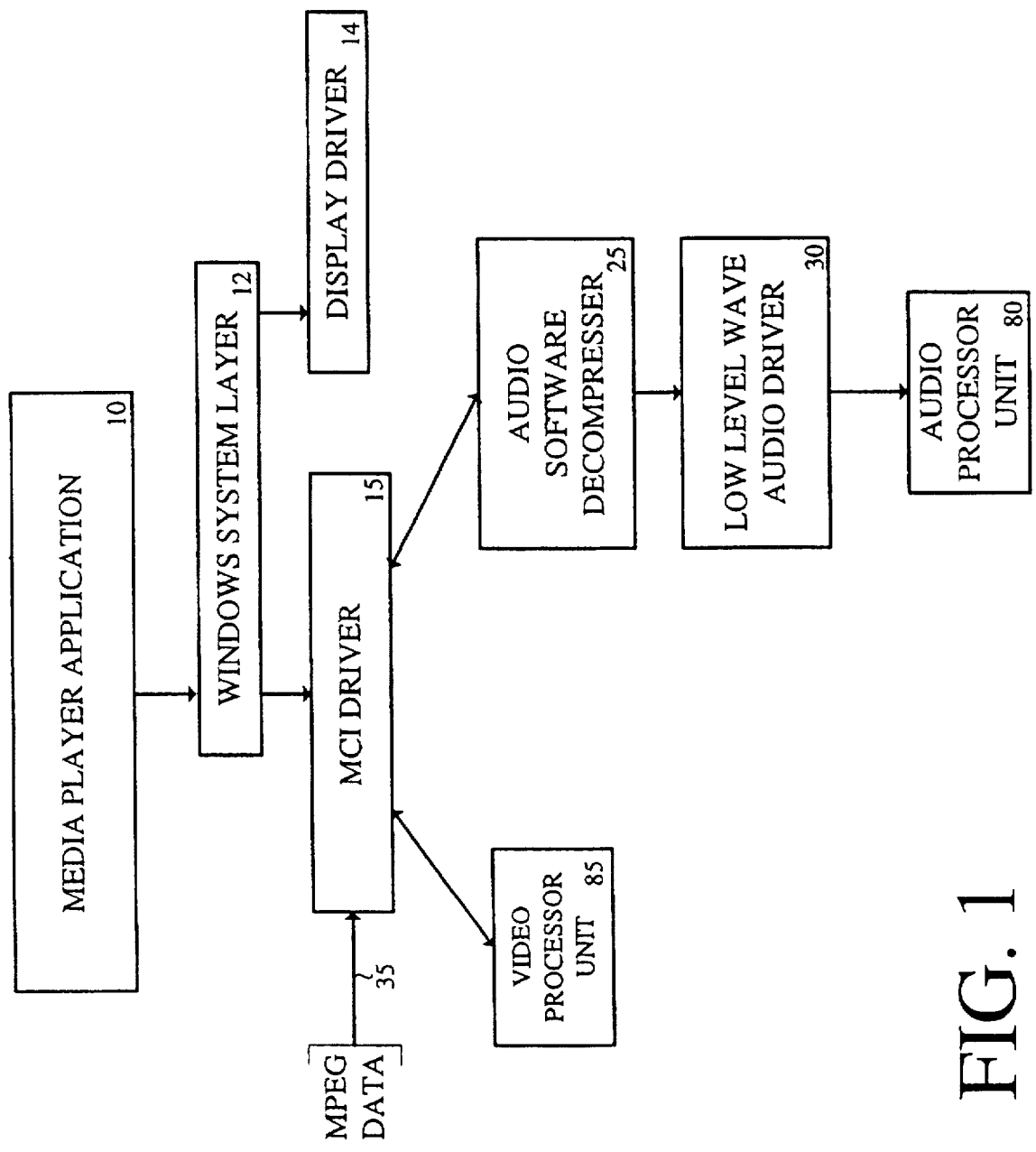
FIG. 1 is a diagram illustrating the logical layers of hardware and software within the environment of the error handling procedure of the present invention.

In the following detailed description of the present invention, numerous specific details are set forth in order to provide a thorough understanding of the present invention. However, it will be obvious to one skilled in the art that the present invention may be practiced without these specific details or by using alternate elements or methods. In other instances well known methods, procedures, components, and circuits have not been described in detail as not to unnecessarily obscure aspects of the present invention.

NOTATION AND NOMENCLATURE

Some portions of the detailed descriptions which follow are presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a computer system. For reasons of convenience, and with reference to common usage, these signals are referred to as bits, values, elements, symbols, characters, terms, numbers, or the like with reference to the present invention.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussions, it is understood that throughout discussions of the present invention, discussions utilizing terms such as "processing" or "computing" or "calculating" or "determining" or "displaying" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers or other such information storage, transmission or display devices.

The present invention includes an error recovery procedure 700 for responding to detected errors within an MPEG playback file. The method of the present invention (e.g., process 700 of FIG. 4A and FIG. 4B) is operable within a system environment (e.g., system 40 of FIG. 1) including a computer system or other computer controlled digital playback system (e.g., system 50 of FIG. 2). The computer system 50 includes a video processor unit (e.g., unit 85 of FIG. 3). These elements, along with the method of the present invention, are described below.

SYSTEM OVERVIEW

FIG. 1 shows a system overview 40 of an hardware/software environment of the present invention including different logical control levels. Media player application 10 (application 10) is a software procedure executable within a computer system or dedicated digital playback system (hereinafter referred to as playback system 50, described in more detail with reference to FIG. 2). Application 10 of FIG. 1 typically interfaces with a user which selects a particular audio/video file (e.g., a motion picture with sound) to be played on the playback system 50. In the playback system 50, audio signals are sent to a sound generation device (e.g., a speaker) and video signals are rendered on a display screen. In accordance with the present invention, application 10 can be of a number of well known media player applications.

Application 10 interfaces with and controls, e.g., via software calls, a low level driver 15 which is a lower level software program to application 10. This control is executed through a system layer 12 (e.g., a Windows™ system layer 12). The system layer 12 also communicates with a display driver 14, which is not particularly pertinent to the present invention. Within the present invention, application 10 issues commands to the MCI driver 15 requesting playback of a selected audio/video file beginning at a requested playback time. In one embodiment, the low level driver 15 is an MCI type driver. The MCI driver 15 of the present invention contains low level function calls to the hardware units (e.g., video processor unit 85 and audio processor unit 80) and to other lower level software routines (e.g., audio software decompresser 25) to control the playback of the selected audio/video file. The specific routines (e.g., process 700) within the MCI driver 15 that perform error handling functions in accordance with the present invention will be described further below. The MCI driver 15 opens filenames (e.g. representative of an audio/video file) that are supplied by application 10. MCI driver 15 also reads in the selected audio/video file from its source (e.g. source 105 FIG. 2) and performs any required initialization of the playback system 50 to play the selected audio/video file.

Application 10 and MCI driver 15 process audio and visual digital data within an MPEG format (the MPEG data) which is defined specifications ISO/IEC 11172-1 to ISO/IEC 11172-3, et seq. (1993). However, as will be evident from the error handling procedures 700 of the present invention, the present invention can be equally suited for use with other variable coded recording formats in addition to the MPEG recording format. As shown in FIG. 1, encoded MPEG data representative of the audio/video file is received over line 35, from an MPEG source 105 (FIG. 2), to the MCI driver 15. Alternatively, the MPEG data can also be directly supplied to application 10 which then transfers the MPEG data to MCI driver 15. Either implementation is considered within the scope of the present invention.

The MPEG audio and video data is formatted according to the above referenced MPEG specification. As is known, the digital audio and video MPEG data arrives from separate source (e.g., it is not interleaved) and does not arrive in playback order. Although MPEG data is displayed within a constant frame rate, it is recorded using a variable data rate whereby individual recorded frames do not contain a uniform amount of data.

The MCI driver 15 of the present invention, via software function calls, controls the processing of video MPEG data. MCI driver 15 controls a video processor unit 85 by reading and writing data to control registers and responding to interrupt signals originated by the video processor unit 85. This video processor unit 85 is described in more detail with reference to FIG. 3. The MCI driver 15 also controls processing of audio MPEG data by controlling a low level audio software decompresser 25. In one embodiment of the present invention, the error handling process 700 resides within the MCI driver 15 (which is stored in computer readable memory). Audio software decompresser 25 can be one of a number of well known software routines that are executable within the playback system 50. Audio software decompresser 25 decompresses audio MPEG data in accordance with the above referenced MPEG specifications.

Audio software decompresser 25 controls and supplies decompressed audio signals to a low level wave audio driver 30 that is also executable within the playback system 50. A number of well known MCI or Microsoft based wave audio drivers can be used in accordance with the present invention as driver 30. Low level wave audio driver 30 controls the presentation of audio signals (e.g., typically digital) to an audio processor unit 80. Audio processor unit 80 is a hardware sound generation device and typically is implemented as a plug-in circuit board to the playback system 50. In accordance with the present invention, several well known sound generation devices, such as a Sound Blaster™ products, Microsoft Sound™ products, Media Vision™ products, and similar products can be used as the audio processor unit 80. An audio time counter (e.g., 33 bit value at 90 kHz) is maintained by the above audio elements.

PLAYBACK SYSTEM 50

Figure 2:
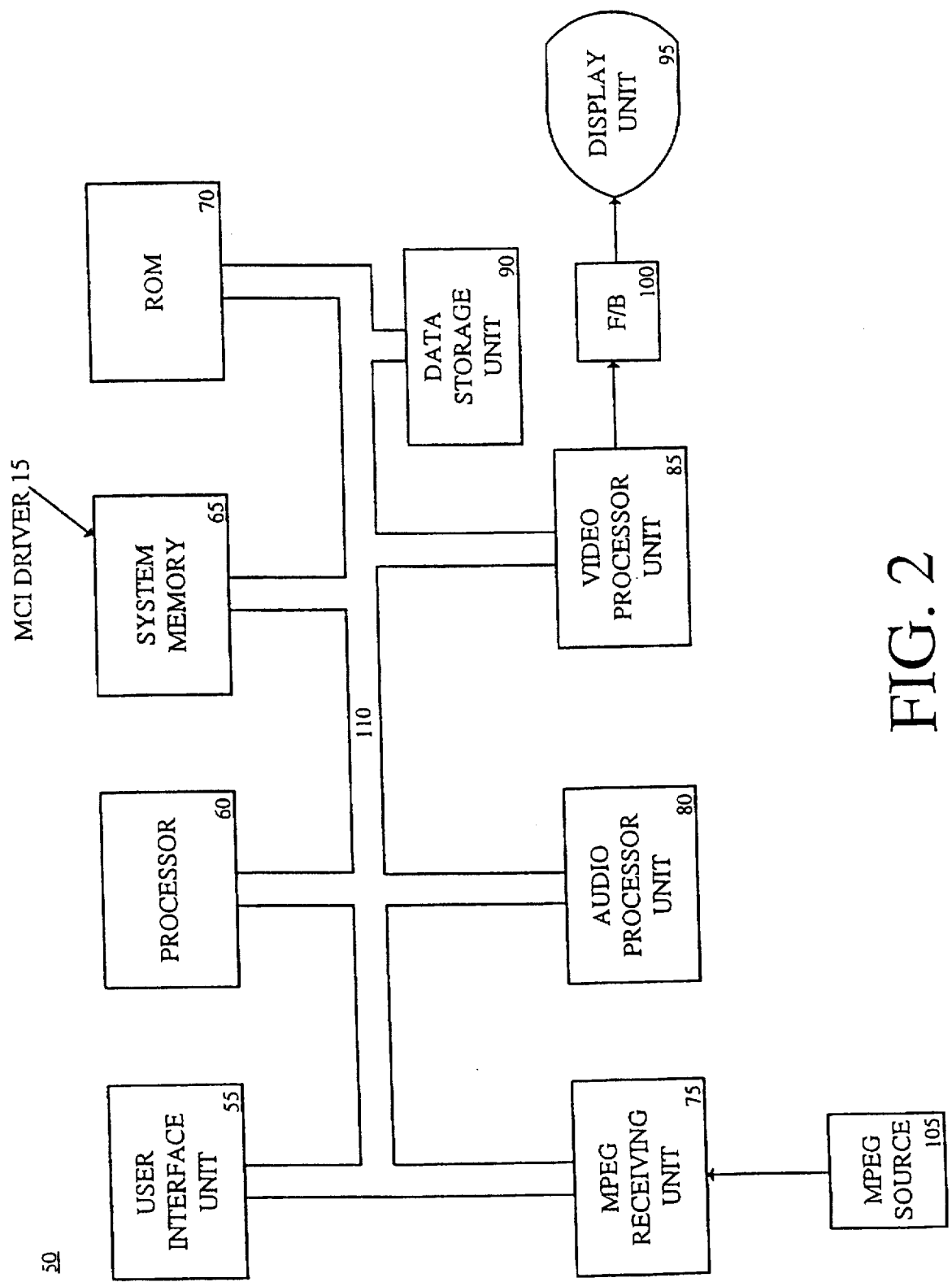
FIG. 2 is a logical hardware diagram illustrating an exemplary hardware platform of the present invention.

FIG. 2 illustrates a hardware block diagram of the playback system 50 as discussed above. The playback system 50 can be based on a computer system platform or can be based on a computer controlled dedicated digital audio/visual playback system. Playback system 50 contains an address/data bus 110 for carrying digital address and data signals. A processor 60 (e.g., a central processing unit) for executing instructions and processing data is connected to the address/data bus 110 as well as a system memory 65 which includes computer readable volatile memory (e.g., RAM); memory system 65 can be used for storing program code information (e.g., process 700 of the present invention) and MPEG data. A computer readable non-volatile memory unit (e.g., ROM) 70 is also coupled to address/data bus 110 and can be used for storing program information. An optional computer readable data storage device 90 (e.g., a disk drive, CD-ROM drive, or other optical drive) can be coupled to address/data bus 110. Optionally, a user interface unit 55 (e.g., including a keyboard and a cursor directing device) can be coupled to address/data bus 110.

In one embodiment, process 700 of the MCI driver 15 of the present invention is located within memory addressable by playback system 50 (e.g., system memory 65 or memory 70) and is executed by processor 60.

FIG. 2 also includes hardware units for processing audio/video MPEG data. An MPEG source 105 and an MPEG receiving unit 75 are used to store and receive the MPEG data into the playback system 50. The MPEG receiving unit 75 (e.g., a modem, a CD-ROM hardware controller unit, or a disk drive hardware controller unit, etc.) is coupled to address/data bus 110 for receiving MPEG data from the MPEG source 105. The MPEG source 105 can include a CD-ROM device, a disk drive device, a computer network (e.g., the internet) or any other digital signal storage medium. Also coupled to address/bus 110 is the audio processor unit 80 and the video processor unit 85. The video processor 85 is also coupled to a frame buffer (F/B) unit 100 which typically contains volatile memory referred to as video memory. The F/B unit 100 is cyclically read by well known raster update circuitry to generate an analog or digital video output signal to a display unit 95 which can be CRT or flat panel based.

It is appreciated that in alternative embodiments, both audio and video MPEG data are sent to input buffers of the video processor unit 85; the video processor unit 85 then parsing out the audio video data and forwarding same to the audio software decompresser 25.

VIDEO PROCESSOR UNIT 85

Figure 3:
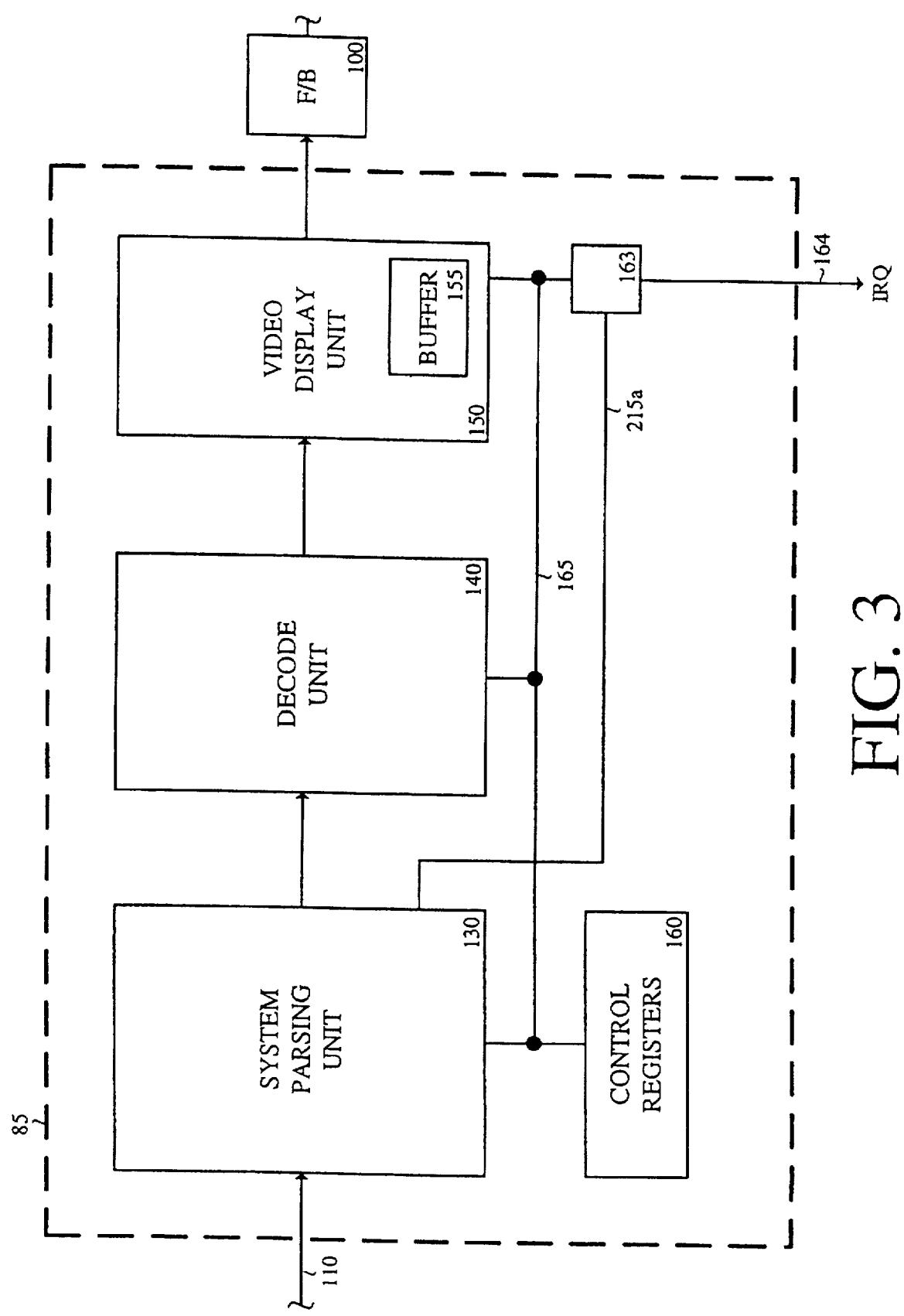
FIG. 3 is a logical block diagram illustrating hardware components of the video processor unit in accordance with the present invention.

FIG. 3 illustrates components of the video processor unit 85 used by the present invention. The video processor unit 85 is a hardware circuit that receives encoded MPEG data from a MPEG source 105 and decodes the data for playback on display unit 95. MCI driver 15 controls the supply of MPEG data to the video processor unit 85. Specifically, the video processor unit 85 signals the MCI driver 15 with threshold low interrupt signals to cause the MCI driver 15 to control MPEG information flow to the video processor unit 85.

In one exemplary implementation, the 5518 chip device supplied by Cirrus Logic of California can be used as the video processor unit 85 however, other video processors can also be used. Video processor unit 85 contains a system parsing unit 130 which contains a buffer memory for receiving digital video MPEG data (which in one embodiment is supplied over address/bus 110). The system parsing unit 130 contains circuitry for interrogating compressed MPEG data packets to locate and identify video frames and their frame type (e.g., B, P or I class as defined by the above referenced MPEG specifications) as the MPEG data is presented over bus 110. The system parsing unit 130 also interrogates the compressed video MPEG data to determine the video presentation time stamp (time stamp) for each video MPEG data packet. The time stamp, as is known in the MPEG format, is a 33 bit binary number (based on a 90 kHz clock) and represents the intended presentation time for a video frame.

The system parsing unit 130 outputs a compressed video MPEG signal to a decode unit 140 which contains circuitry for (1) decompressing and (2) decoding the input compressed video MPEG signal. The decompression and decoding functions performed by the decode unit 140 are in accordance with the MPEG specifications as referenced above. Decode unit 140 reconstructs presentation units (e.g., pictures) from compressed data and forwards them in a synchronized sequence according to their presentation times. The decode unit 140 outputs a decoded and decompressed video MPEG signal to a video display unit 150. The video frames output by the decode unit 140 are in playback sequence and are supplied at a constant frame rate. The video display unit 150 contains a relatively limited size data buffer 155 (e.g., a 3 to 4 frames in size) and is used to transfer the decompressed and decoded video frames to the F/B unit 100 for rendering on the display unit 95 (see FIG. 2).

The video processor unit 85 of FIG. 3 also contains a set of control registers 160 which contain memory locations (e.g., bits or bytes) for controlling the video processor unit 85. One memory location (e.g., register) is for storing a video processor flush command. Other memory locations are for storing a frame pause indicator, a frame skip indicator and a resume playback indicator. Control register 160 also contains a video time counter (e.g., 33 at 90 kHz) representative of the video frame display. Control register 160 is coupled to system parsing unit 130, decode unit 140 and the video display unit 150 via control bus 165. A control and interrupt generation (CIG) circuit 163 is also coupled to control bus 165. CIG circuit 163 is also coupled to system parsing unit 130 via line 215a. CIG circuit 163 generates an interrupt request over line 164 to processor 60 (FIG. 2) of the playback system 50 to interrupt MCI driver 15 and performs other control features described below. One such interrupt informs the MCI driver 15 when the internal input buffers of the video processor 85 are empty or near empty as specified by the control registers 160.

The video processor unit 85 recovers certain MPEG information stored within specific locations of MPEG defined data packets (as defined by the above referenced MPEG specification). Specifically, using well known techniques, the video processor unit 85 is able to locate a rate_bound parameter from an MPEG system_header, an audio or video packet header (e.g. within a packet layer), the start of an I frame and the start of a sequence header, and is able to locate a presentation_time_stamp ("time stamp") within a pack_start_code or within an audio or video packet header.

When used with an x86 host computer system, the video processor unit 85 is typically connected into an ISA slot and includes 500 kbytes to 1 Megabyte of DRAM internally. In this embodiment, the video processor unit 85 is coupled to the feature connector of an internal VGA card of the playback system 50.

ERROR HANDLING PROCEDURE 700 OF THE PRESENT INVENTION

Figure 4A:
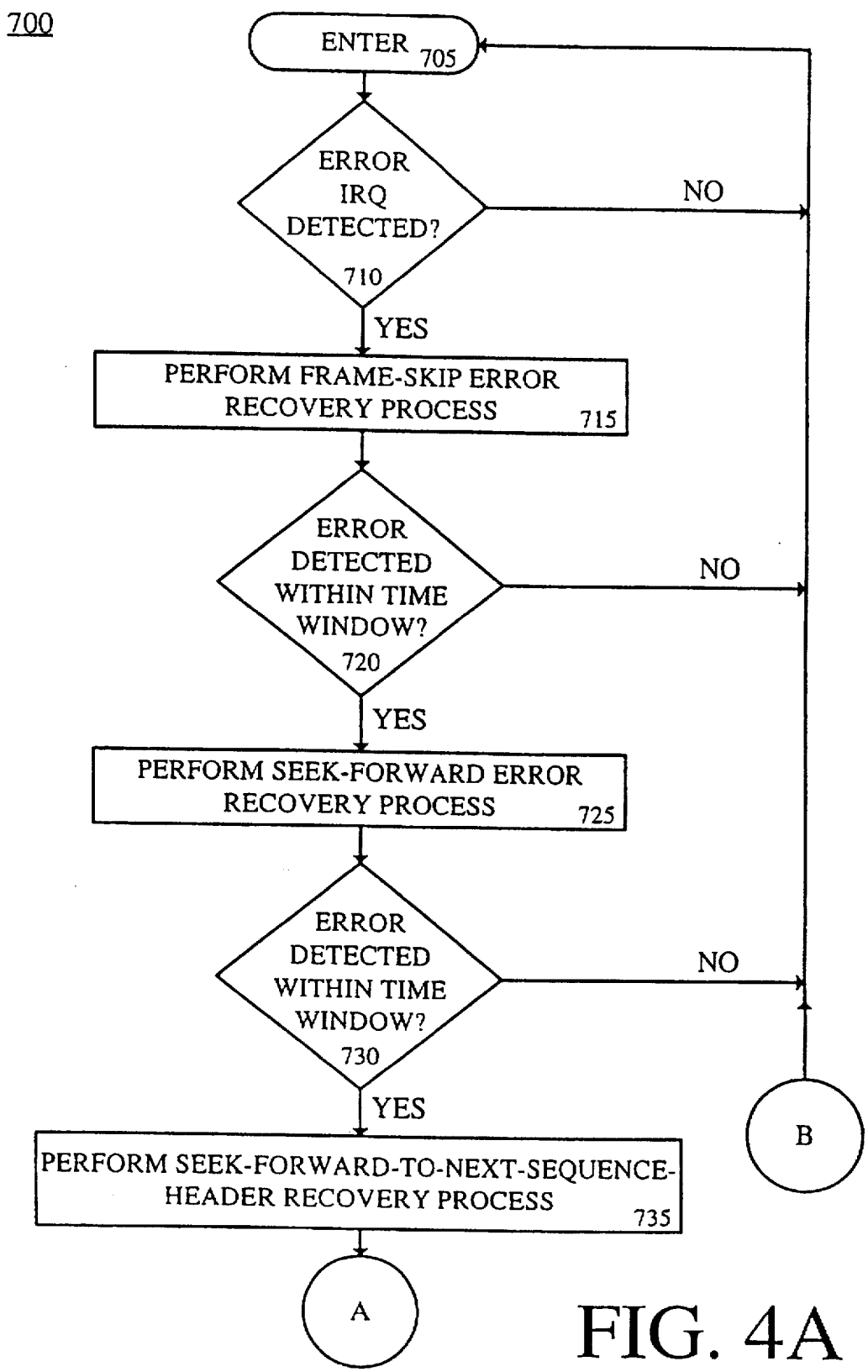
FIG. 4A illustrates steps of the error handling process (sequence) of the present invention in response to encountered MPEG errors including the frame skip, seek forward, and seek-forward-to-sequence-header error handling processes.
Figure 4B:
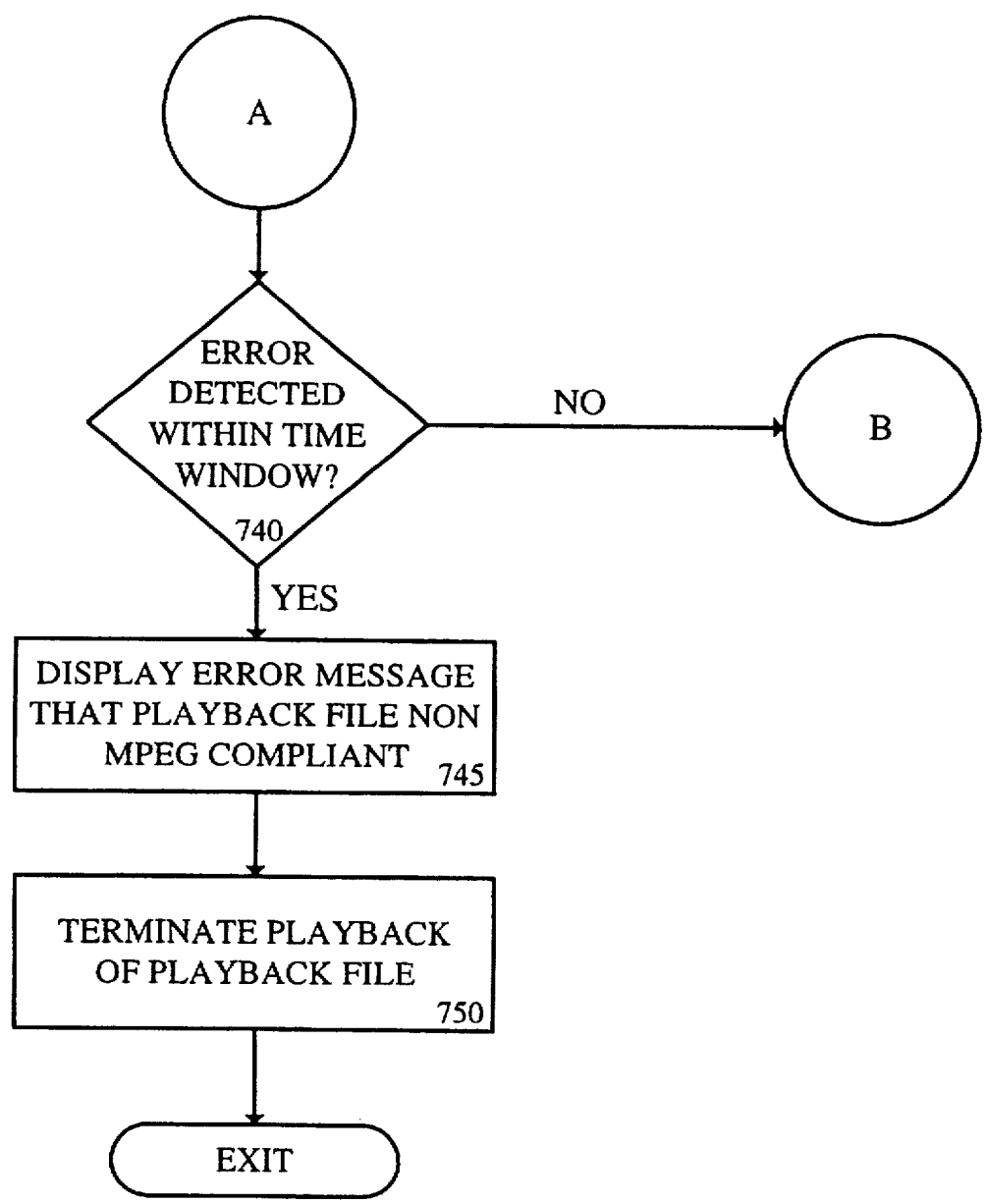
FIG. 4B illustrates further steps of the error handling process of the present invention in response to encountered MPEG errors.

The error handling procedure 700 of the present invention is shown in FIG. 4A and FIG. 4B. It is assumed that procedure 700 is active during the playback of a selected audio/video playback file over the playback system 50. As described below, error handling procedure 700 includes three error recovery processes implemented to respond to detected errors within an audio/video playback file. The three recovery processes are utilized in a predetermined sequence for repeat (e.g., back-to-back) errors. It is appreciated that procedure 700 is implemented as program code stored within computer readable memory (e.g., memory 65, memory 70) of the playback system 50.

With respect to FIG. 4A, process 700 commences at step 710 where the present invention responds to an interrupt signal generated over line 164 from the video processing 85 (FIG. 3). During playback of a selected MPEG audio/video playback file, if the video processor 85 detects an error in the MPEG data stream, it interrupts the MCI driver 15 (FIG. 1) over line 164. A detected error can be the result of an error in the MPEG stream, an error in the bus 110, or an error in data transmission. An error in the MPEG stream can result from a fault in the memory or storage unit containing the audio/video playback file (e.g., a bad sector in a disk drive or CD-ROM drive). Upon detecting a first error of a sequence, step 710 causes the playback system 50 to enter step 715. If no error is entered at step 710, processing returns to 705.

Step 715 of FIG. 4A is the "frame skip" error recovery process. At step 715, in response to the detected error, the playback system 50 instructs the video processor unit 85 to skip B and P frames of the current playback file until the next I frame is detected at which time normal playback is allowed. By skipping the B and P frames, the present invention attempts to bypass the detected error with minimal degradation in playback quality. The steps of the frame skip error recovery process 715 are described in more detail regarding FIG. 5.

A back-to-back or repeat playback error is defined as a detected error occurring within a predetermined time window following a previously detected error. A back-to-back or repeat error can also be defined as a detected playback error occurring within a predetermined number of data bytes following a previously detected playback error. In one implementation of the present invention, the time window defining a repeat error is on the order of seconds (e.g., within 1 to 5 seconds), but can be longer or shorter. In alternative embodiments of the present invention, different time windows can be used. Further, embodiments of the present invention utilize a data window in conjunction with or in lieu of the above time window to define a repeat error. In such case, a repeat error occurring within a predetermined number of bytes (e.g., within 150 kilobytes) of a previously detected error is recognized as a repeat error. Both of the implementations above are within the scope of the present invention.

At step 720, if a first repeat playback error is detected following the first playback error (e.g., detected at step 710), then the present invention performs a "seek forward" error recovery process 725. A repeat error is detected if an error interrupt is received from the video processor unit 85 within the given time window (and/or data window) measured from the time the error of step 710 was detected. At step 720, if the repeat error time window expires without a subsequent detected error or the repeat error data byte window is overrun without a subsequent detected error, then the current or latest playback error is considered bypassed and processing returns to 705 to initialize or reset the error recovery procedure 700.

At step 725 of FIG. 4A, the present invention causes the playback system 50 to seek forward in the current playback file a predetermined number of seconds from its present position and normal playback is resumed. The seek forward error recovery process 725 is designed in part to bypass a fault in the storage unit containing the MPEG playback file (e.g., a fault located in a sector of a hard drive or CD-ROM drive). By seeking forward a brief number of seconds (e.g., 1 to 3), the present invention at step 725 attempts to skip the currently accessed sector in an effort to bypass the detected fault without causing a substantial amount of degradation in the playback quality. The seek procedure used in step 725 is seek procedure 400 which is capable of seeking to a given position within a playback file having a variable data rate format (e.g., MPEG). Seek procedure 400 is described in more detail commencing with FIG. 8. The steps of seek forward error recovery process 725 are described in more detail with respect to FIG. 6.

At step 730 of FIG. 4A, if a second repeat playback error is detected following the first repeat error (e.g., detected at step 720), then the present invention performs a "seek-forward-to-sequence-header" error recovery process 735. A repeat error is detected at 730 if playback system 50 receives an error interrupt over line 164 from the video processor unit 85 within the given time window (and/or data window) measured from the time the error of step 720 was detected. At step 730, if the repeat error time window expires without a repeat error or the repeat error data byte window is overrun without a repeat error, then the current or latest playback error is considered bypassed and processing returns to 705 to initialize or reset the error recovery procedure 700.

At step 735 of FIG. 4A, the present invention causes the playback system 50 to seek forward in the current playback file to the next sequence header as defined by the above referenced MPEG specifications. At step 735, the video processor unit 85 reads the data of the current playback file commencing at the fault location skipping all data that is not a sequence header. Upon reaching the sequence header, normal playback is resumed. The steps of the seek forward to sequence header error recovery process 735 are described in more detail in FIG. 7.

At step 740 of FIG. 4B, if another repeat playback error is detected following a second repeat playback error (e.g., detected at step 730), then the present invention was unable to bypass or eliminate the current playback error with the present invention recovery procedure 700. In this case, step 745 is entered. A repeat error is detected at 740 if the playback system 50 receives an error interrupt from the video processor unit 85 within the given time window (and/or data window) measured from the time the error of step 730 was detected. At step 740, if the repeat error time window expires without a repeat error or the repeat error data byte window is overrun without a repeat error, then the current error is considered bypassed and processing returns to 705 (via label "B") to initialize or reset the error recovery procedure 700.

At step 745 of FIG. 4B, the present invention process 700 displays an error message (e.g., over display unit 95 of FIG. 1) to inform the user or the viewer that the current playback file has been halted and may be non-MPEG compliant due to detected non-recoverable errors. At step 750, the present invention causes the playback system 50 to terminate playback of the current playback file. Steps 750 and 745 can occur in any order or simultaneously. The error recovery process 700 then exists.

It is appreciated that the present invention error recovery process 700 offers a effective set of error handling procedures to respond to errors detected within an MPEG playback file. The preferred embodiment of the present invention utilizes the frame skip procedure 715, the seek forward procedure 725, and the seek-forward-to-sequence-header procedure 735 in the particular sequence as shown in FIG. 4A and FIG. 4B. In this sequence, the error handling procedures that are expected to create the least amount of playback degradation are used first in an attempt to bypass the playback error. However, alternative embodiments of the present invention can utilize the above error handling procedures in different order within the scope of the present invention. Specifically, in one embodiment process 725 can be used before process 715.

FRAME SKIP ERROR RECOVERY PROCESS 715

Figure 5:
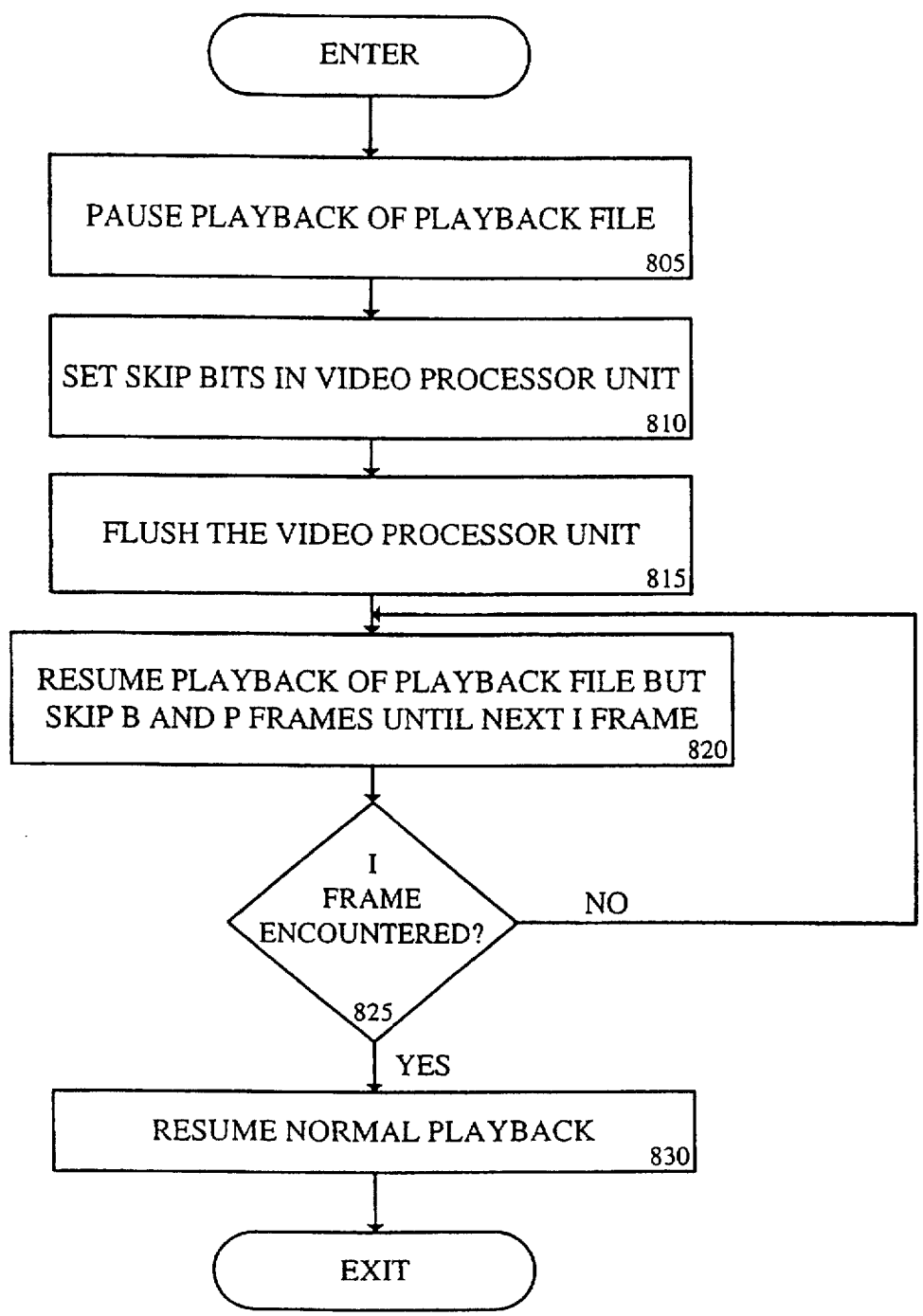
FIG. 5 illustrates steps of the frame skip error handling process of the present invention.

Steps of the frame skip error recovery process 715 of the error handling procedure 700 of the present invention are shown with respect to FIG. 5. At step 805, the MCI driver 15 pauses playback of the current playback file. The playback file is paused by preventing further data from being written to the input port to the video processor unit 85 and by setting a pause bit within the video processor unit 85 (e.g., located within control registers 160, FIG. 3). By not writing data into the input port of the video processor unit 85, the processing of the system parsing unit 130 temporally terminates. The processing of the decode unit 140 temporally terminates upon writing pause bits into the control registers 160.

At step 810 of FIG. 5, the MCI driver 15 causes the playback system 50 to set the skip bits (within control registers 160) of the video processor unit 85. Next, at step 815, the MCI driver 15 causes the playback system 50 to flush its current data by setting flush bits also within the control registers 160 of the video processor unit 85.

At step 820, the present invention resumes normal playback of the current playback file by resetting the pause bits of control registers 160 and by supplying the video processor unit 85 with MPEG data from the current playback file. Since the skip bits remain set (from step 810), the decode unit 140 and the video display unit 150 of the video processor unit 85 are instructed to skip any encountered B and P MPEG frames of the current playback file until the next I frame is received. It is appreciated that the system parsing unit 130 identifies the B, P and I frames from the current playback file.

At step 825 of FIG. 5, if an I frame is not received, processing returns to step 820 where B and P frames of the current playback file are skipped. Upon the occurrence of an I frame, step 825 transfers control of error recovery process 715 to step 830. At step 830, the received I frame is processed by the video processor unit 85 and displayed. The present invention also resets the skip bits within control registers 160 and sets a playback bit to allow true normal playback of the current playback file. Processing of the frame skip error recovery process 715 then exits.

By skipping B and P frames until the next I frame is encountered, the present invention error recovery process 715 attempts to bypass the encountered playback error with a minimum amount of observable playback degradation.

SEEK FORWARD ERROR RECOVERY PROCESS 725

Figure 6:
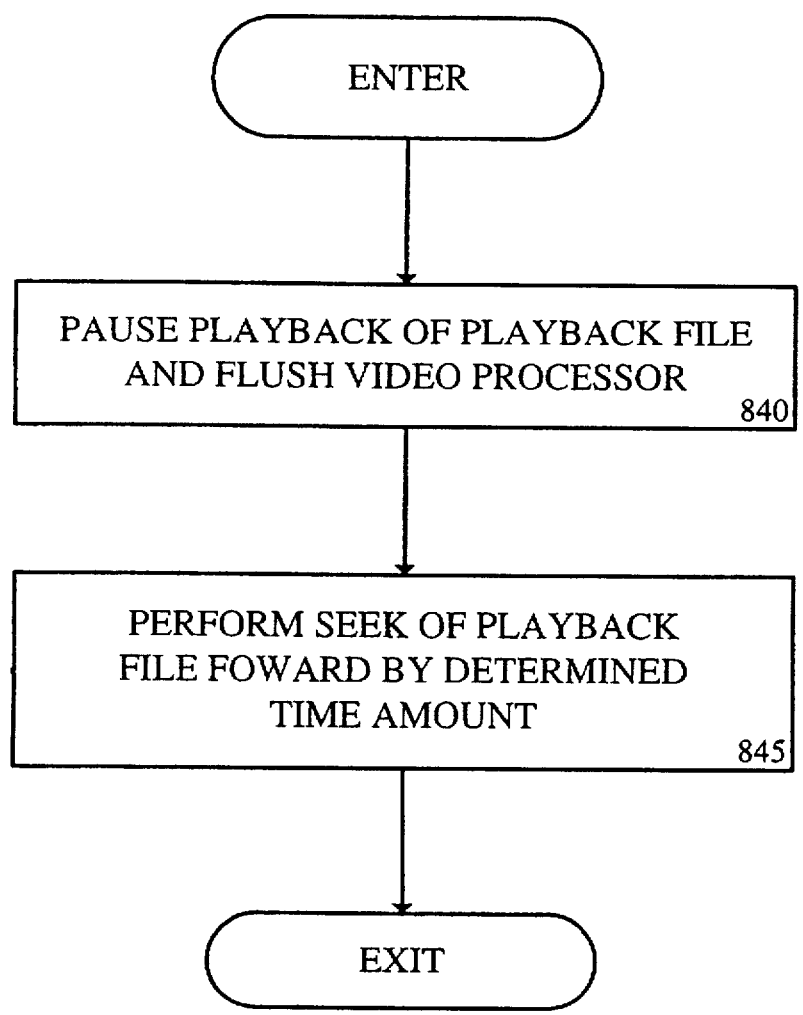
FIG. 6 illustrates steps of the seek forward error handling process of the present invention.

Steps of the seek forward error recovery process 725 of the error handling procedure 700 of the present invention are shown with respect to FIG. 6. Process 725 begins at step 840 where playback of the current playback file is paused and the video processor unit 85 is flushed. Details of these steps (e.g., pausing and flushing) are described in more detail with respect to FIG. 5. It is appreciated that to the extent process 400 (FIG. 8) duplicates these steps, the pause and flush steps of 840 are not required with respect to process 725.

A seek forward step is then performed at 845 of FIG. 6. At step 845, the present invention seeks forward within the current playback file a predetermined amount of time (e.g., on the order of seconds). This predetermined amount of time can vary within the scope of the present invention but in one embodiment is between 1 to 3 seconds. Alternatively, at step 845, the current playback file is seeked forward by a predetermined number of frames. Within the MPEG format, although the data rate can vary within the MPEG data, a constant frame rate is maintained. At step 845, the present invention can also specify a fixed amount of data by which to seek forward. In one embodiment, the current playback file is seeked forward by approximately 150 kilobytes of data at step 845.

For the implementation wherein a predetermined seek forward time is selected or a predetermined number of frames are seeked forward, at step 845 the current playback time or current playback frame (e.g., at the fault location) is recorded. Methods to perform this recordation are well known. At step 845, the present invention then adds the predetermined seek forward time to the current time to arrive at a target playback time at which to seek. Alternatively, at step 845, the present invention adds the predetermined seek forward frame number to the current frame number to arrive at a target frame number at which to seek. Lastly, if a data amount is requested by which to seek forward, a seek forward time can be computed from this value by taking the data amount and dividing it by an estimated data rate (obtained from the rate_bound of the MPEG data, see FIG. 8).

Once the target playback time (in seconds) or the target frame number (in frames) is determined, the present invention at step 845 calls seek procedure 400. In one embodiment, the call takes the format shown below:

_SEEK(File_Handle, "Seek to" Parameter)

File_Handle is the name of the current playback file and the "seek to" parameter is the target playback time or the target frame number. Seek procedure 400 is a specially adapted seek procedure for seeking within a recorded and encoded file having a variable data rate format (e.g. MPEG). Procedure 400 seeks forward into the specified playback file to the target playback time or target frame number and begins playback of the playback file at that time. It is appreciated that the seek procedure 400 in the present application does not need to be as accurate in locating its target playback time or target frame number as might be the case in other seek applications. In this regard, the predetermined match tolerance used in step 490 of FIG. 9 can be as large as 1 to 2 seconds or 40 to 80 frames (assuming 40 frames/second frame rate).

By skipping forward a small predetermined number of seconds or frames, the present invention error recovery process 725 attempts to bypass the encountered error without a substantial amount of observable playback degradation.

SEEK FORWARD TO SEQUENCE HEADER ERROR RECOVERY PROCESS 735

Figure 7:
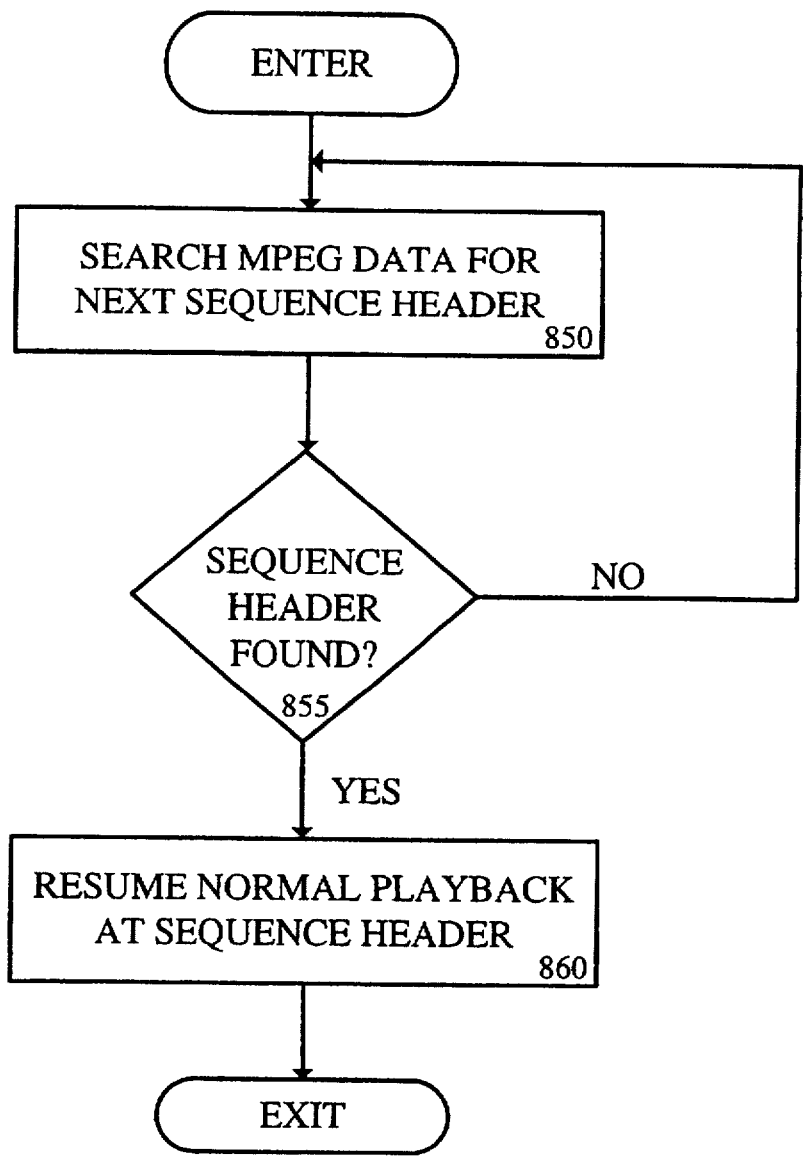
FIG. 7 illustrates steps of the seek-forward-to-sequence-header error handling process of the present invention.

Steps of the seek-forward-to-sequence-header error recovery process 735 of the error handling procedure 700 of the present invention are shown with respect to FIG. 7. Process 735 begins at step 850 where the received MPEG data is searched to discover the next sequence header therein. It is appreciated that during this search, the video display unit 150 is not updating the F/B unit 100 and a constant image is held on the display screen 95. This searching function can be performed within the video processor unit 85 or can be performed by processing within the MCI driver 15 executed on the host playback system 50.

Within the MPEG format, a sequence header is presented at the start of each major scene change within the video portion of the playback file and marks an effective reset or "start" position within the playback file. Sequence headers are relatively separated within a playback file and can be as far apart as several minutes depending on the changes in the character of the playback scenes. The sequence header contains information as to the new mux rate, the frame rate, and also contains quantization matrices for the new scene to be rendered. The sequence header is also known as a "B3" MPEG frame and starts with the following code: "0x 00 00 01 B3." The present invention searches for this code at step 850. At step 855, if this code is discovered, then processing flows to step 860, else the current playback file is searched further by flowing back to step 850.

At step 860 of FIG. 7, the present invention resumes normal playback of the current playback file starting with the located sequence header by setting an appropriate playback bit within the control registers 160. The video processor unit 85 is prepared for normal playback and previous information located therein (if any) is flushed just before normal playback.

By skipping forward to the next sequence header, the present invention error recovery process 725 attempts to bypass the encountered error while tolerating some observable playback degradation. This error recovery process is typically performed after processes 715 and 725 due to the expected playback degradation it causes. However, for errors not recovered from by processes 715 and 725, process 735 is an effective error recovery tool with an acceptable amount of observable playback degradation.

SEEK PROCEDURE 400

As described with reference to FIG. 6, the present invention seek forward error recovery process 725 utilizes the seek procedure 400 of FIG. 8.

Figure 8:
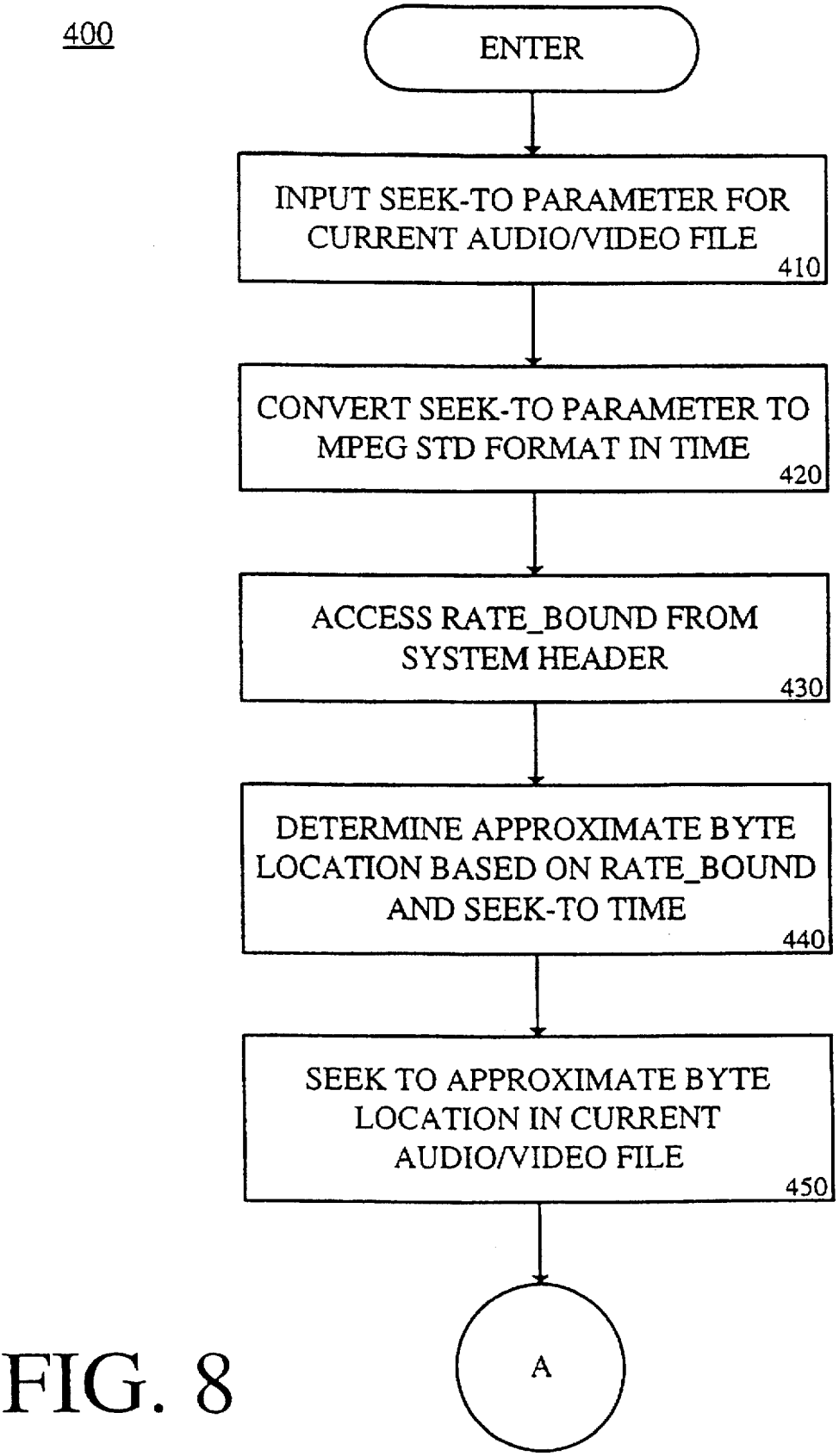
FIG. 8 is a flow diagram illustrating initial steps of the seek procedure used by the present invention.

With reference to FIG. 8, the initial steps of the seek procedure 400 of the present invention are illustrated. Procedure 400 provides an efficient and effective method of seeking to a requested playback time within an audio/video file that is recorded in a variable data rate format. As described above, procedure 400 is a computer implemented procedure and is operable within playback system 50 as part of the MCI driver 15. Procedure 400 assumes that a user, or some other originator, selected a particular audio/video file and the MCI driver 15 accessed the audio/video file (e.g., opened the file) and performed any required software initiation.

Procedure 400 of FIG. 8 starts at step 410 where a "seek to" parameter is received (typically from a user). The "seek to" parameter specifies a requested playback time (of the audio/video file) that the user desires to have played back over the playback system 50. In one embodiment, the "seek to" parameter can be represented in units of frame numbers or can be represented in units of time (e.g., milliseconds), however, other units of time (e.g., seconds, minutes and hours) can also be used. Often, the "seek to" parameter is received as part of a seek command that is issued from the media player application 10 to the MCI driver 15. A number of command formats can be used, and an exemplary command format in accordance with step 410 is shown below:

_SEEK(File_Handle, "Seek to" Parameter)

Where File_Handle is the name or handle of the selected audio/video file (the playback file). In accordance with the present invention, the above referenced seek command is able to operate with a playback file recorded in a variable data rate format.

At step 420, the present invention converts the units of the "seek to" parameter into units (e.g., "ticks") of a 90 kHz clock which is an MPEG time format (e.g., 1 ms is 90 ticks while 1 sec is 90,000 ticks). An exemplary 33 bit binary number format is used to store the result of the conversion. At step 420, if the received "seek to" units are in seconds, then the present invention multiplies the seconds by 90,000 (e.g., 1 sec is equal to 90,000 ticks) to arrive at the corresponding MPEG time format. At step 420, if the received "seek to" units are in milliseconds, then the present invention multiplies the milliseconds by 90 to arrive at the corresponding MPEG time format. The MPEG frame rate, FR, is constant within a given audio/video file playback. The FR value is typically between 30 and 50 frames per second. At step 420, if the "seek to" units are given in frame numbers (FN) then the present invention utilizes the below relationship to arrive at the corresponding requested playback time in MPEG time format:

RTIME (MPEG Format)=[(FN/FR)×1,000]×90

Where RTIME is the requested playback time in MPEG time format corresponding to the "seek to" parameter. Assuming a frame rate (FR) of 40 frames per second and a frame number (FN) of 4,000, the above relationship gives (4,000/40)×1,000 or 100,000 ms. The requested playback time in MPEG time format is then 100,000×90 or 9 million ticks.

At step 430 of FIG. 8, the present invention accesses the rate_bound information from the system_header of the selected audio/video file. The system_header is defined in section 2.4.3.2 of the ISO/IEC 11172-1: (1993) specification and contains a number of defined fields (e.g., system_header_start_code, header_length, marker_bit, etc.), including the rate_bound field. The rate_bound field indicates the maximum data rate of the MPEG data recorded within the selected audio/video file. In one embodiment, the maximum data rate is expressed in bytes/second but can also be expressed in bits/second. Step 430 of the present invention can be performed using a number of well known methods and components.

Specifically, in one embodiment, the rate_bound is an integer value greater than or equal to the maximum value of the mux_rate field coded in any pack of the ISO/IEC 11172 multiplexed stream. The mux_rate is a positive integer specifying the rate at which the system target decoder receives the ISO/IEC 11172 multiplexed steam during the pack in which it is included. In one embodiment, the value of mux_rate is measured in bytes/second (never zero) and is rounded upward. The value represented in mux_rate is used to define the time of arrival of bytes at the input to the system target decoder. The value encoded in the mux_rate field can vary from pack to pack in an ISO/IEC 11172 multiplexed stream.

At step 440 of FIG. 8, the present invention determines an approximate byte location within the selected audio/video file to perform a first seek in an effort to locate a data packet corresponding to the requested playback time. This approximate byte location is based on the maximum data rate and the requested playback time. The following relationship is used:

ABL=rate_bound (bytes/sec)×[RTIME(ticks)/90,000(ticks/sec)]

Where ABL is the first approximate byte location based on the rate_bound value and RTIME is the requested playback time (in ticks) as defined above. ABL is an offset byte location within the selected audio/video file. At step 450, the MCI driver 15 executes a seek to command to the determined approximate byte location within the selected audio/video file. A number of seek command formats can be used for step 450 (including a number of well known Microsoft command formats) and the below format is exemplary:

_LSEEK(File_Handle, ABL)

Where File_Handle is a name or handle for the selected audio/video file and ABL is the first approximate byte location (a byte offset location within File_Handle) as described above. Processing 400 then continues to FIG. 9.

Figure 9:
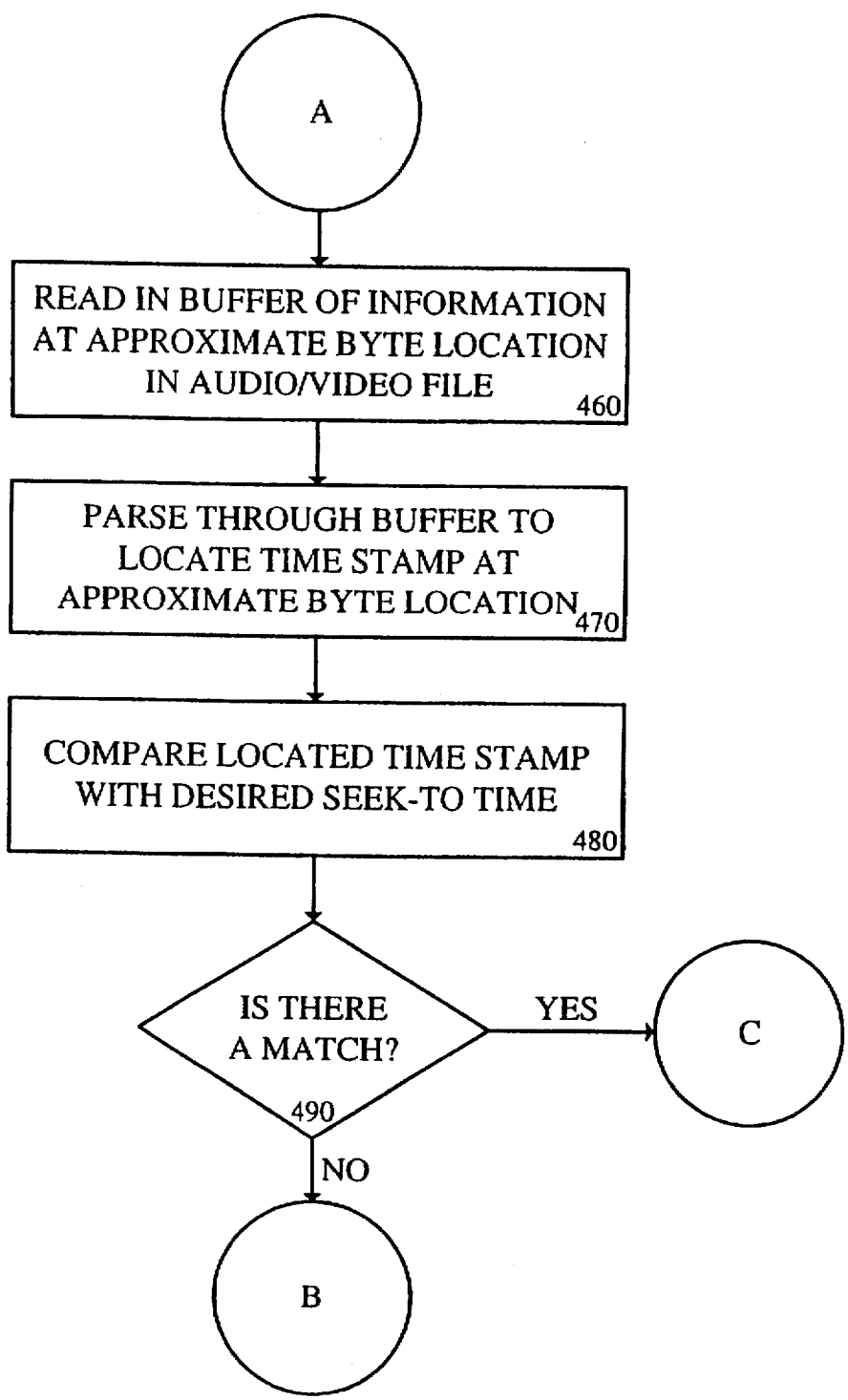
FIG. 9 is a flow diagram illustrating intermediary steps of the seek procedure used by the present invention.

With reference to FIG. 9, at step 460, the MCI driver 15 of the present invention then executes a read instruction so that a buffer's worth of MPEG information commencing at the ABL position is read into computer memory (e.g., system memory 65, but can also be stored in storage memory 90). The buffer size is adjustable but in one embodiment is on the order of 150 kbytes in size. A number of read command formats can be used for step 460 (including a number of different well known Microsoft formats) and the format below is exemplary:

_LREAD(File_Handle, Buffer_Handle)

Where Buffer_Handle is the name or handle of the memory buffer that is to contain the data from the read command.

At step 470, the present invention parses through the data stored in the buffer to locate a presentation_time_stamp ("time stamp") near the approximate byte location. The time stamp is a 33 bit binary coded number and represents the intended playback time of the data packet associated with the time stamp and is represented in ticks of the 90 kHz reference clock. At step 470, three locations are searched to locate the first time stamp in the buffer. The first location is within a pack layer just following the pack_start_code. The second and third locations, respectively, are within the audio (code 0010) packet header and video (code 0011) packet header. These fields are well defined in sections 2.4.3.2 and 2.4.3.3 of the ISO/IEC 11172-1 (1993) specification. Once located, the first encountered time stamp is recorded by the MCI driver 15. It is appreciated that step 470 can be performed by the MCI driver 15 or can be performed by the video processor unit 85 under control of the MCI driver 15.

Figure 11:
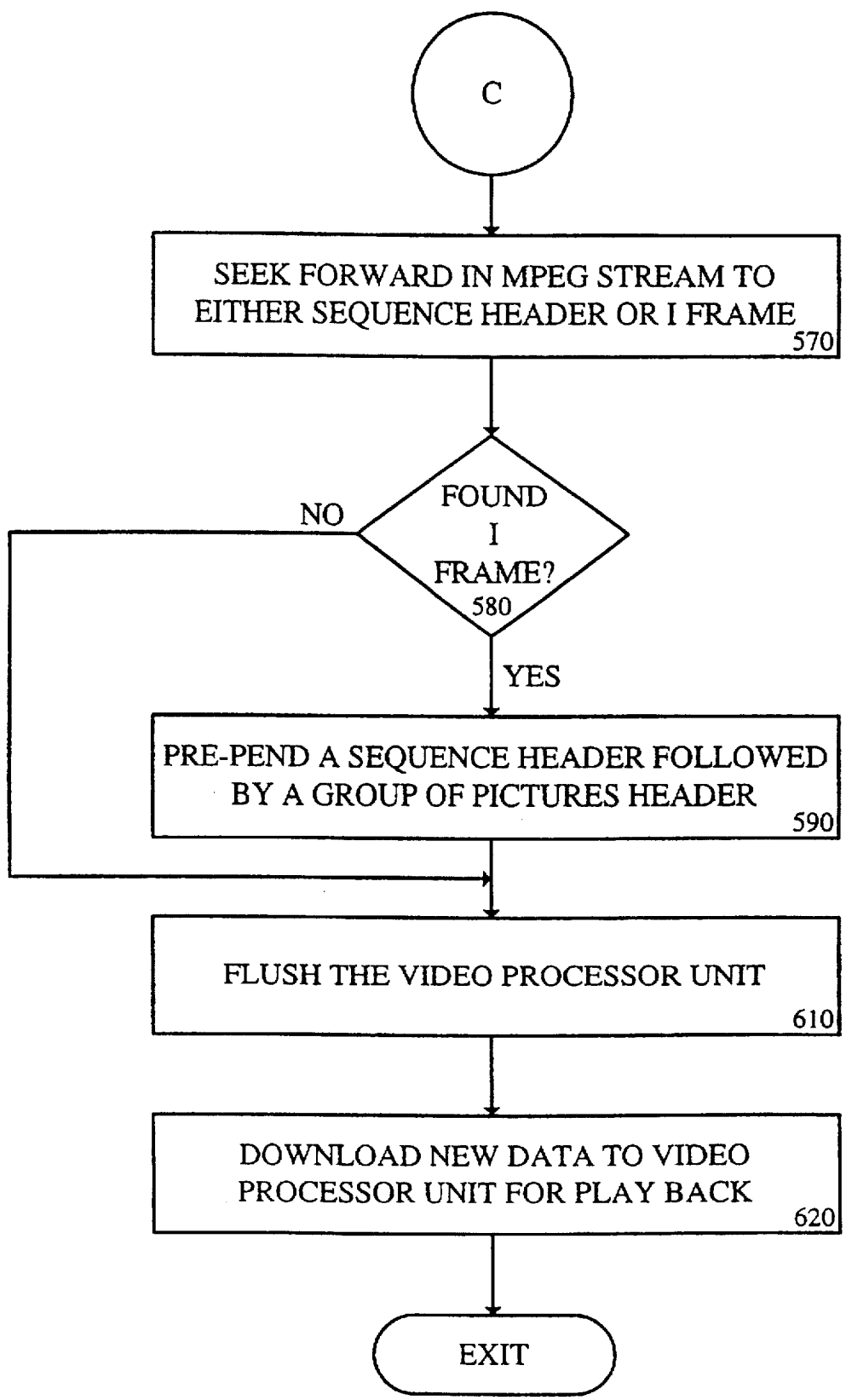
FIG. 11 is a flow diagram illustrating completion steps of the seek procedure used by the present invention.

At step 480 of FIG. 9, the MCI driver 15 instructs the playback system 50 to compare the value of the located time stamp of step 470 with the requested playback time (RTIME). Both values are within the MPEG time format (e.g., ticks of the 90 kHz reference clock). At step 490, if the above two time values are within a predetermined match tolerance, then a match is indicated and processing flows to label C (FIG. 11). At step 490 of FIG. 9, if no match is determined, then processing flows to label B (FIG. 10).

FIG. 10 illustrates the steps of procedure 400 of the present invention when no match results at step 490. Generally, the steps of FIG. 10 attempt to adjust the data rate based on the current time stamp value, the current approximate byte location, and the old value of the data rate; then a new approximate byte location is determined. Specifically, at step 510, the present invention determines a new data rate based on the approximate byte location (ABL) and the most recently discovered time stamp value. The following relationship is used at step 510:

$$NDR_i(bytes/sec)=ABL(bytes)/[time\ stamp\ value/\ 90,000]$$

Where $NDR_i$ is the new data rate value in bytes/second for the ith iteration through step 520 before a match is located. At step 520, the MCI driver 15 adjusts the current data rate by averaging the $NDR_i$ value with the previous data rate value (e.g., $NDR_{i-1}$) to obtain a current data rate. The first time process 400 executes through step 520 (e.g., i=1), the previous data rate value (e.g., $NDR_{i-1}$) is the maximum data rate (determined from the rate_bound field at step 430). However, for the second and subsequent times step 520 is executed (i=2 to n), the previous data rate value (e.g., $NDR_{i-1}$) is the NDR value determined by the just previous execution of step 520. The following relationship is used at step 520:

$$CDR_i=[NDR_i+NDR_{i-1}]/2$$

Where $CDR_i$ is the current data rate determined at step 520 for the current iteration, i, through step 520 and is expressed in bytes/second.

At step 530 of FIG. 10, the MCI driver 15 updates the approximate byte location by determining a new approximate byte location based on the current data rate value produced at step 520 and the requested playback time (RTIME). At step 530 the following relationship is used:

$$NABL_i=CDR_i\times[RTIME/90,000(ticks/sec)]$$

Where $NABL_i$ is the new approximate byte location for the current iteration, i, through step 530 and is expressed in bytes.

At step 540 of FIG. 10, the MCI driver determines if the newly determined $NABL_i$ is equal or substantially equal to the just previously determined approximate byte location ($NABL_{i-1}$). Upon the first pass through step 540, the just previously determined approximate location (e.g., $NABL_{i-1}$) is ABL as determined in step 440. Upon the second and subsequent passes through step 540, $NABL_{i-1}$ is taken from the value produced by the last operation of step 530. The following relationship is used at step 540

$$NABL_i=?\ NABL_{i-1}$$

If at step 540 the values, $NABL_i$ and $NABL_{i-1}$, have not substantially changed (e.g., they are the same or within a predetermined tolerance), then process 400 of the present invention exits with an error message via step 550. In this case, the requested playback time was not found and no further updates to the approximate byte location can be made in an effort to locate the requested playback time. In other words, the approximate byte location does not update substantially. In this event, an error message is relayed via playback system 50 to the user and the seek command fails without locating the requested playback time. This can occur if the MPEG data is corrupted or incomplete.

At step 540, if the values, $NABL_i$ and $NABL_{i-1}$, are not the same or not within the predetermined tolerance, then processing flows to step 560 of FIG. 10. At step 560, the MCI driver 15 performs a seek command to a position within the selected audio/video file indicated by the new approximate byte location for the current iteration, i. A number of seek command formats can be used for step 560 and the format below is exemplary:

_LSEEK(File_Handle, $NABL_i$)

Where File_Handle is a name or handle for the selected audio/video file and $NABL_i$ is the new approximate byte location (a byte offset location within File_Handle) for the current iteration, i, that is determined as described above. Processing then returns to label A (e.g., step 460 of FIG. 9) where the present invention determines if the new approximate byte location is a match. If not, another new approximate byte location is determined in another iteration, i, until a match occurs at step 490 (FIG. 9) or until the error condition at step 540 (FIG. 10) is met. Upon each iteration, i, the present invention attempts to get closer to the requested playback time (RTIME) by refining the current data rate.

FIG. 11 illustrates the steps of procedure 400 of the present invention when a match results at step 490 (FIG. 9). Upon step 570 being processed, the portion of the MPEG data corresponding to the required playback time has been located within the buffer of system memory. This MPEG data is now ready to be played back after some initializations are performed. At step 570, beginning at the current approximate byte location, the MCI driver 15 seeks forward through the MPEG data stream (stored in the buffer) until the first of either a sequence header or an I frame (also called I picture) is discovered. The sequence header and the I frame are well known in the art and defined in the above referenced MPEG specifications. At step 580 of the present invention, the MCI driver 15 determines if step 570 located an I frame. If not, processing flows to step 610. If step 570 located an I frame, then processing continues to step 590. At step 590, the MCI driver 15 pre-pends a sequence header onto an outgoing MPEG stream followed by a pre-pending a group-of-pictures header onto the outgoing MPEG stream.

At step 610 of FIG. 11, the video processor unit 85 is flushed by the MCI driver 85 by writing flush bits into the control register 160 (FIG. 3). This prepares the video processor unit 85 for receiving the outgoing MPEG stream. At block 620, the MPEG data located in the selected audio/video file at the requested playback time is then added to the outgoing MPEG stream and the outgoing MPEG stream is then down loaded into the video processor unit 85 for playback. Normal playback is resumed at block 620 and the video processor unit 85 interrupts the MCI driver when its buffer is getting empty. The MCI driver 85 responds by supplying new MPEG data (from the MPEG source 105 of FIG. 2) to the video processor unit 85.

Process 400 of the present invention then exits and returns control to step 845 of FIG. 6.

The preferred embodiment of the present invention, a method is described for performing a sequence of error recovery processes to recover from playback errors in an MPEG playback file. While the present invention has been described in particular embodiments, it should be appreciated that the present invention should not be construed as limited by such embodiments, but rather construed according to the below claims.

What is claimed is:

1. In a digital playback system including a video processor unit and a software driver, a computer controlled method of handling playback errors in a playback file, said method comprising the steps of:

(a) in response to a detected playback error, skipping frames of said playback file of a first frame type until a frame of said playback file of a second frame type is encountered and resuming playback of said playback file;

(b) in response to a detected playback error, seeking forward within said playback file by a predetermined amount defined by a seek parameter and resuming playback of said playback file; and (c) in response to a detected playback error, seeking forward within said playback file to a position marked by a substantial scene change within a video portion of said playback file and resuming playback of said playback file.

2. A method as described in claim 1 further comprising the steps of:

detecting a playback error caused by a data fault located in a source of said playback file; and detecting a playback error caused by a data fault located in a transmission line of said playback system transmitting said playback file.

3. A method as described in claim 1 wherein said frames of said first frame type are B and P frames of the Motion Pictures Expert Group (MPEG) format and wherein said frame of said second frame type is an I frame of said MPEG format.

4. A method as described in claim 1 wherein said predetermined amount defined by said seek parameter represents a measure of time on the order of seconds.

5. A method as described in claim 1 wherein said predetermined amount defined by said seek parameter represents a measure of data on the order of kilobytes.

6. A method as described in claim 1 wherein said position marked by a substantial scene change within said video portion of said playback file is represented by a sequence header within the Motion Pictures Expert Group (MPEG) format.

7. In a digital playback system including a video processor unit and a software driver, a computer controlled method of handling playback errors in an MPEG playback file, said method comprising the steps of:

(a) in response to a detected first playback error, skipping frames of said playback file of a first frame type until a frame of said playback file of a second frame type is encountered and resuming playback of said playback file;

(b) in response to a detected first repeat playback error, seeking forward within said playback file by a predetermined amount defined by a seek parameter and resuming playback of said playback file; and (c) in response to a detected second repeat playback error, seeking forward within said playback file to a position marked by a substantial scene change within a video portion of said playback file and resuming playback of said playback file.

8. A method as described in claim 7 further comprising the steps of:

detecting said first repeat playback error within a predetermined window following said first playback error; and detecting said second repeat playback error within said predetermined window following said first repeat playback error.

9. A method as described in claim 8 wherein said predetermined window is a time measurement on the order of seconds.

10. A method as described in claim 8 wherein said predetermined window is a data measurement on the order of kilobytes.

11. A method as described in claim 8 wherein said frames of said first frame type are B and P frames of the Motion Pictures Expert Group (MPEG) format and wherein said frame of said second frame type is an I frame of said MPEG format.

12. A method as described in claim 8 wherein said predetermined amount defined by said seek parameter represents a measure of time on the order of seconds.

13. A method as described in claim 8 wherein said predetermined amount defined by said seek parameter represents a measure of data on the order of kilobytes.

14. A method as described in claim 8 wherein said position marked by a substantial scene change within said video portion of said playback file is represented by a sequence header within the Motion Pictures Expert Group (MPEG) format.

15. A computer controlled playback system comprising:

a central processing unit coupled to bus; and a computer readable memory coupled to said bus, said computer readable memory having computer readable program code stored therein for causing said playback system to handle detected playback errors within a playback file, said program code causing said playback system to perform the following steps:

(a) in response to a detected first playback error, skipping frames of said playback file of a first frame type until a frame of said playback file of a second frame type is encountered and resuming playback of said playback file;

(b) in response to a detected first repeat playback error, seeking forward within said playback file by a predetermined amount defined by a seek parameter and resuming playback of said playback file; and (c) in response to a detected second repeat playback error, seeking forward within said playback file to a position marked by a substantial scene change within a video portion of said playback file and resuming playback of said playback file.

16. A playback system as described in claim 15 wherein:

said first repeat playback error is detected within a predetermined window following said first playback error; and said second repeat playback error is detected within said predetermined window following said first repeat playback error.

17. A playback system as described in claim 16 wherein said predetermined window is a time measurement on the order of seconds.

18. A playback system as described in claim 16 wherein said predetermined window is a data measurement on the order of kilobytes.

19. A playback system as described in claim 16 wherein said frames of said first frame type are B and P frames of the Motion Pictures Expert Group (MPEG) format and wherein said frame of said second frame type is an I frame of said MPEG format.

20. A playback system as described in claim 16 wherein said predetermined amount defined by said seek parameter represents a measure of time on the order of seconds.

21. A playback system as described in claim 16 wherein said predetermined amount defined by said seek parameter represents a measure of data on the order of kilobytes.

22. A playback system as described in claim 16 wherein said position marked by a substantial scene change within said video portion of said playback file is represented by a sequence header within the Motion Pictures Expert Group (MPEG) format.

* * * * *